United States Patent Office.

CHARLES FREDERICK HOEING, OF HUDSON CITY, NEW JERSEY, ASSIGNOR TO HIMSELF AND DANIEL GILCHER, OF SAME PLACE.

Letters Patent No. 67,763, dated August 13, 1867.

IMPROVED MEDICINE FOR CURE OF FEVER.

The Schedule referred to in these Letters Patent and making part of the same.

TO ALL WHOM IT MAY CONCERN:

Be it known that I, CHARLES FREDERICK HOEING, of Hudson city, in the county of Hudson, and State of New Jersey, have invented a new and improved Fever Composition; and I do hereby declare that the following is a full, clear, and exact description thereof, which will enable others skilled in the art to make and use the same.

This invention relates to certain new and useful discoveries in the healing art, whereby fever and ague, intermittent and remittent fevers, and other fevers of a similar character are successfully treated; and the invention and discovery consist, in forming a composition, of the ingredients hereinafter named and in the proportions specified, that is to say, quinoidine or precipitated extract of Peruvian bark or amorphous quinine, four parts; liriodendrin, or the extract of the tulip tree, one (1) part; alcohol, twenty-four (24) parts. The ingredients above named—quinoidine and liriodendrin—to be prepared according to directions found in the United States Dispensary, of George B. Wood and Franklin Bache.

What I claim as new, and desire to secure by Letters Patent, is—

A composition, formed of the ingredients and in the proportions herein described, for the purposes set forth.

The above specification of my invention signed by me this 29th day of May, 1867.

CHARLES F. HOEING.

Witnesses:
  WM. F. MCNAMARA,
  ALEX. F. ROBERTS.